2,759,026
PROCESS FOR FLUORINATION OF HYDROCARBONS

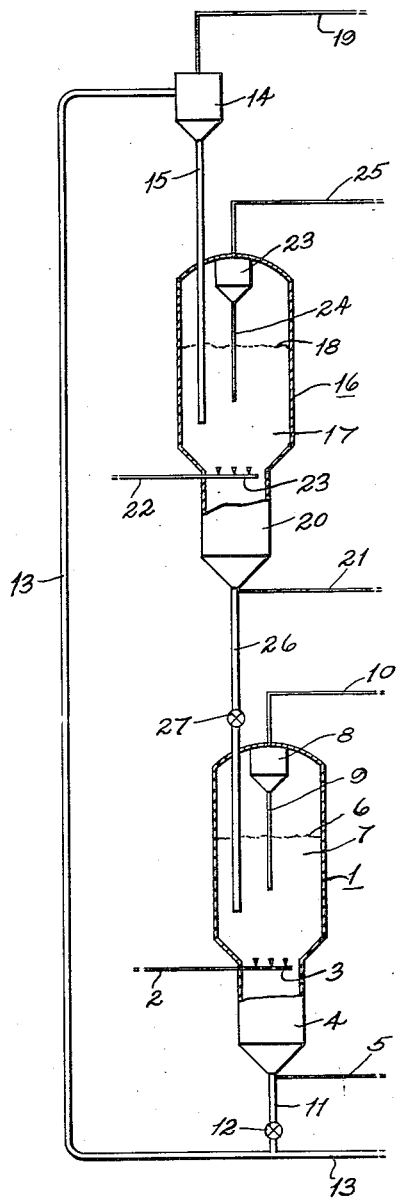

Rush F. McCleary, Hopewell Junction, N. Y., assignor to The Texas Company, New York, N. Y., a corporation of Delaware Application February 1, 1950, Serial No. 141,791

3 Claims. (Cl. 260—653)

This invention relates to an improved method for carrying out the fluorination of organic compounds. More particularly it relates to a method for fluorinating hydrocarbons or hydrocarbon compounds such as halogen substituted hydrocarbons by reactions including addition of fluorine to double or triple bonds, hydrogen substitution and halogen exchange.

Hydrocarbons are fluorinated according to known methods by reacting them with fluorinating agents such as elemental fluorine, hydrogen fluoride or other compounds capable of giving up fluorine to the hydrocarbons under reaction conditions, such as certain metal fluorides in which the metal may exist in more than one state of valence. All of these reactions are highly exothermic and strong cooling must be applied to prevent a violent reaction from occurring with accompanying decomposition of the organic reactant. In the best method so far developed for fluorinating hydrocarbons a slow stream of the hydrocarbon vapor is passed over a shallow, mechanically stirred bed of a metal fluoride such as $CoF_3$ or $MnF_3$, which is regenerated in a batch-wise process after its fluorine content has been reduced to a point where it is no longer an active fluorinating agent.

Because of the extremely high reactivity of the fluorine atom, the fluorination of hydrocarbons is complicated by the large number of side reactions which occur to various extents depending chiefly upon the temperature and upon the concentration of the fluorinating agent in contact with the hydrocarbon molecule. This difficulty has prevented the development of a satisfactory fluorination process, in spite of the great activity in this field due to the considerable commercial importance of fluorinated organic compounds. In the known methods for carrying out the fluorination reactions, large amounts of undesirable products are obtained because of the difficulty in maintaining both uniform temperature and uniform concentration of the fluorinating agent in all parts of the reaction mass. Thus in fluorinating a hydrocarbon by replacement of hydrogen or of halogen both underfluorinated and overfluorinated products are obtained in addition to compounds resulting from dehydrofluorination, decomposition, polymerization and so forth; in attempting to add fluorine to double or triple bonds of unsaturated hydrocarbons, compounds resulting from hydrogen replacement are also formed. Separation of reaction products comprising unreacted compounds and overfluorinated and underfluorinated compounds is difficult because of the anomalous effect of fluorine additions on the boiling points of the hydrocarbon compounds.

It is an object of this invention therefore to provide a method for fluorinating hydrocarbon compounds to produce high yields of a desired product.

A further object of this invention is to provide a method for fluorinating hydrocarbon compounds to a controlled degree.

A still further object of this invention is to provide a method for fluorinating hydrocarbon compounds selectively.

In accordance with the process of this invention, fluorination is effected by passing a hydrocarbon or hydrocarbon derivative in gaseous or vapor form, together with other gases or vapors, if desired, upwardly through a bed of finely divided solids comprising particles of a fluorinating agent at a velocity such that the particles become suspended in the gases or vapors in a turbulent condition resembling a boiling liquid. In this so-called "fluidized" condition the rapid motion of the particles produces a practically instantaneous mixing of reactants introduced into the bed and also makes it possible to maintain a substantially uniform temperature throughout the reaction mass.

The fluorinating agent is a fluorine compound which is capable of reacting with the hydrocarbon under fluorinating conditions to produce fluorinated hydrocarbons. It is most suitably a compound capable of being regenerated, so that it can be reused repeatedly in a continuous process. The preferred class of compounds for this purpose comprises metal fluorides in which the metal is capable of existing in both a higher and a lower state of valence, such as, for example, $CoF_3$, $MnF_3$, $AgF_2$, $CeF_4$, $SbF_5$, $BiF_5$, $PbF_4$, $CrF_4$, $CrF_5$ and $HgF_2$. These compounds are not identical in their fluorinating action so that the fluoride employed is preferably selected according to the hydrocarbon reactant and the type of reaction desired. The most generally suitable fluorinating agent of this class is $CoF_3$, both from the standpoint of fluorinating action and of convenience in application. However, in some cases, it is more advantageous to use other metal fluorides; for example, in treating heavier hydrocarbons, $MnF_3$ or $CeF_4$ may be preferred. The metal fluorides may be used alone or in admixture with each other or with other solids which may be catalytic to the reaction such as metallic copper, or which may be inert materials such as silica gel or activated carbon serving as diluents, carriers, heat conductors and so forth.

The metal fluorides become reduced in the reaction to compounds in which the metal is in a lower state of valence and which contain fewer atoms of fluorine in the molecule, and are regenerated by any suitable means, such as by passing gaseous fluorine through the particles either alternately or simultaneously with the hydrocarbon reactant. Both the gaseous fluorine employed for regeneration and the hydrocarbon reactant may be mixed with an inert diluent gas such as $N_2$, $SiF_4$, etc. In the preferred form of my invention, the metal fluoride particles circulate between the reaction zone and a separate regeneration zone, which may be within a separate vessel or formed within the reaction vessel itself by suitably disposed baffles, as shown, for example in U. S. 2,445,328.

The hydrocarbon reactant may be any compound containing one or more hydrocarbon or substituted hydrocarbon groups capable of being fluorinated by addition and/or substitution reactions. Such hydrocarbon groups may be aliphatic, cyclic, heterocyclic or aromatic in nature, and may have some or all of their hydrogens replaced by substituents such as chlorine which are replaceable by fluorine under fluorinating conditions. Examples of such compounds which may be mentioned include ethylene, butane, butadiene, heptane, perchloroheptane, cyclopentane, hexachlorocyclopentadiene, benzene, perchlorobenzene, xylene, mesitylene, anthracene, methylpyridiene and diphenyl oxide. Hydrocarbon mixtures such as various petroleum fractions may also be fluorinated by the method of this invention to obtain commercially valuable products suitable as lubricants and solvents.

Conditions under which the reaction is carried out will vary considerably with the nature of the hydrocarbon charged and the products desired. In general temperatures ranging from about 100° C. to about 400° C., and pressures rainging from atmospheric to 1600 pounds per square inch or higher may be employed. The amount of solid fluorinating agent maintained in the reactor will preferably be such as to give a mol ratio of available flourine to hydrogen or chlorine to be replaced of at least about 4 to 1, and preferably at least 6 to 1, although concentrations as low as about 1 to 1, may be employed in some cases. Concentration of metal fluoride to give a mol ratio of available fluorine to hydrogen or chlorine to be replaced of about 6 to 1 may be employed where substantially complete replacement of hydrogen or chlorine is desired per pass.

It is generally preferable to employ a metal fluoride which is a solid under the reaction conditions. However, a compound which is in liquid or even vapor form under these conditions may be applied by spraying the compound into the reactor containing a fluidized bed of solids such as a porous carrier material or a reduced form of the metal fluoride which separates out during the reaction due to its higher melting point. For example $SbF_5$, which is a liquid at room temperature and which boils at 149.5° C., may be sprayed into the reactor where it is converted by the reaction into $SbF_3$, having a melting point of 292° C. In this case, the reaction is carried out at temperatures below 292° C. so that the $SbF_3$ separates out as finely divided solid and is maintained in the fluidized condition by the gaseous reactants. The metal fluoride may be sprayed into the reactor at a point either above or below the fluidized solids bed. Where the reaction temperature is above the boiling point of the metal fluoride, the latter is preferably introduced at the bottom of the reactor, so that the metal fluoride vapor passes upwardly together with the hydrocarbon feed through the fluidized solids bed. According to another method of employing a normally liquid fluorinating agent, a porous carrier such as activated carbon may be impregnated with the compound and charged to the reactor.

Metal fluoride leaving the reactor by entrainment of the vapor or finely divided solids in the effluent gases is separated from the gases or condensed reaction products by the conventional methods and returned either to the reactor or to the regenerator.

The diagram shows a system suitable for carrying out the fluorination of a hydrocarbon employing a metal fluoride as the fluorinating agent in a continuous cyclic process.

In the drawing a hydrocarbon feed is introduced into the reactor designated by reference character 1 through line 2 and distributor head 3. The reactor contains a dense suspension of finely divided solids comprising a metal fluoride such as $CoF_3$, having a particle size within the range 100 to 300 mesh.

The hydrocarbon feed may be in gaseous or vapor form or it may be at least partially in the liquid phase so that a part of the exothermic heat of reaction is taken up in vaporizing the feed and bringing it to reaction temperature. Heat exchange elements containing a heat exchange fluid such as water or Dowtherm, are preferably provided also to assist in maintaining the desired temperature. With a hydrocarbon reactant such as n-heptane, for example, the temperature is suitably maintained at 150° C. to 250° C.

The lower part of the reactor below distributor head 3 is constricted to form a stripping zone 4. Metal fluoride particles settling into this zone are maintained in a dense fluidized condition by means of an inert aerating and stripping gas introduced through line 5. Any inert gas such as nitrogen may be employed. This inert gas together with the stripped products rises into the upper zone 7 above the hydrocarbon feed inlet, where it serves as a diluent in the reaction. Additional amounts of a diluent gas may be introduced together with the hydrocarbon feed through line 2. The total amount of gases introduced through both line 2 and line 5 is adjusted to give a gas velocity through reaction zone 7 such that the metal fluoride particles are maintained in a dense turbulent suspension having a level 6 similar to that of a liquid. In general, space velocities of the vapors passing through this zone will be between 0.4 and 3.0 volumes per volume of fluidized fluorinating agent per hour.

Reactor 1 is preferably constructed of sufficient height so that a substantial free space exists above the solids level 6 to reduce the amount of solids entrained in the product gases leaving the reactor. For this purpose a free space of 4 to 10 feet or more is desirable.

Product vapors leaving the reaction zone pass through a suitable separating device such as cyclone separator 8 for removing entrained metal flouride particles. The solids separated from the vapors are returned to the fluidized solids bed through standpipe 9 to a point below the level 6. The product vapors, freed of entrained solids, pass out through line 10 to suitable separating and treating units which form no part of this invention. Any selected fraction of the separated products may be recycled to the reactor in admixture with the fresh feed.

A stream of metal fluoride particles is continuously or intermittently removed from the reactor through standpipe 11 at a rate controlled by valve 12. The particles are picked up at the base of standpipe 11 by a suitable carrier gas and transported through transfer line 13 to separator 14, where they are separated from the carrier gas and pass downwardly through standpipe 15 into zone 17 of regenerator 16 at a point below the level 18 of a fluidized bed of the metal fluoride particles. The carrier gas from which the particles have been separated leaves separator 14 by line 19 and may be recirculated through line 13 in a closed cycle.

Regenerator 16 is preferably similar in design to reactor 1, of sufficient height to provide a free space above the fluidized solids bed and a lower constructed zone 20 into which an aerating gas which may also serve for stripping is introduced through line 21. A fluorinating agent such as gaseous fluorine is introduced through line 22 and distributor head 23, together with an inert diluent gas if desired. As in the operation of reactor 1 the velocity of the gases passing through regenerator 16 is such that the metal fluoride particles form a dense turbulent suspension with a pseudo liquid level 18. Gases leaving the fluidized bed pass through separator means 23, where entrained solids are removed and are returned to the fluidized solids bed through standpipe 24 to a point below level 18 of the bed. The gases which have been freed of entrained solids pass out through line 25 and may either be vented or recycled to the regenerator.

A stream of solids is withdrawn from the regenerator through line 26 and returned at a rate controlled by valve 27 to the reactor at a point below the level 6 of the fluidized solids bed.

Both reactor 1 and regenerator 16 are provided with heat exchange elements of any suitable type, which have been omitted from the drawing in the interest of simplicity.

Instead of a single reaction zone as shown in the drawing it is also within the scope of my invention to employ a series of two or more reaction zones, which may be in the form of separate reactors or which may be formed within a single reactor by a suitable arrangement of baffles. Such reaction zones may be operated under the same reaction conditions for the purpose of obtaining a longer contact time of the organic reactant with the fluorinating agent, or a special advantage may be obtained in many cases by conducting the reaction in a series of reaction zones operated under different conditions, so that each stage of a multistage reaction is carried out under the conditions of temperature, pressure, reactant concentration and so forth which are aptimum for that particular stage. For example, in introducing several fluorine atoms into a saturated hydrocarbon, the introduction of the first fluorine atom is relatively difficult, so that more severe reaction conditions may be required for this step in the reaction. After the initial florination, the compound becomes much more reactive and further fluorination may be carried out under more mild conditions in order to limit the reaction to the desired extent and to avoid the formation of excessive amounts of by-products originating from various side reactions. On the other hand, it is frequently the case that more severe reaction conditions must be applied in the final stages of a reaction in order to make the reaction proceed to completion. Such is the case, for example, in replacing the final hydrogen or chlorine atoms for the preparation of perfluorinated compounds. Different fluorinating agents may be employed within the different reaction zones, if desired, in order to vary the strength of the fluorinating action. In general, however, the same metal fluoride will be used in all of the reaction zones, with the advantage of requiring only a single regeneration zone. In the case, the metal fluoride may circulate between each reaction zone and the regeneration zone separately, or, it may circulate between the reaction zones also before returning to the regeneration zone in such a manner as to obtain either concurrent or countercurrent flow between the metal fluoride and the hydrocarbon feed.

Obviously, many modifications and variations of the invention, as hereinbefore set forth, may be made without departing from the spirit and scope thereof, and, therefore, only such limitations should be imposed as are indicated in the appended claims.

I claim:

1. A process for fluorinating a hydrocarbon compound of the group consisting of hydrocarbons and halohydrocarbons capable of fluorination which comprises contacting said hydrocarbon compound in the vapor phase in a conversion zone with a fluidized suspension of solid porous carrier particles, introducing liquid $SbF_5$ into said conversion zone, effecting contact of said hydrocarbon compound with said carrier particles and said $SbF_5$ at a temperature between 100 and 292° C., said temperature being below the melting point of $SbF_3$, at a pressure from atmospheric to about 1,600 p. s. i. g. and at a space velocity of 0.4 to 3.0 volumes of total gas vapor per volume of fluidized suspension per hour, effecting conversion of said hydrocarbon compound to a fluorine-substituted compound and reduction of said $SbF_5$ to solid $SbF_3$ during said contact, said $SbF_3$ being deposited on said carrier particles, continuously removing said fluorine-substituted compound from said reaction zone, continuously withdrawing said carrier particles containing $SbF_3$ from said reaction zone, contacting said mixture of carrier particles and $SbF_3$ with gaseous fluorine in a separate regeneration zone whereby said solid $SbF_3$ is converted to $SbF_5$ and continuously recycling said $SbF_5$ and carrier particles to said reaction zone.

2. A process according to claim 1 in which said $SbF_5$ is introduced into said conversion zone adsorbed on said solid carrier particles.

3. A process according to claim 1 in which said $SbF_5$ is impregnated on activated carbon and charged to the reactor.

References Cited in the file of this patent
UNITED STATES PATENTS

| | | |
|---|---|---|
| 1,810,055 | Muller et al. | June 16, 1931 |
| 1,984,380 | Odell | Dec. 18, 1934 |
| 2,498,546 | Gorin | Feb. 21, 1950 |
| 2,510,872 | Downing | June 6, 1950 |
| 2,568,660 | Rosen | Sept. 18, 1951 |

FOREIGN PATENTS

| | | |
|---|---|---|
| 559,080 | Great Britain | Feb. 3, 1944 |

OTHER REFERENCES

Fowler et al.: "Ind. & Eng. Chem.," vol. 39, pages 292–8 (1947).

McBee et al.: "Ind. & Eng. Chem.," vol. 39, pages 305–9 (1947).